(12) United States Patent
Arai et al.

(10) Patent No.: US 12,359,049 B2
(45) Date of Patent: Jul. 15, 2025

(54) COMPOSITION AND CURED PRODUCT THEREOF

(71) Applicant: DENKA COMPANY LIMITED, Tokyo (JP)

(72) Inventors: Toru Arai, Tokyo (JP); Azusa Yagi, Tokyo (JP); Suguru Onuki, Tokyo (JP); Shota Yamamoto, Tokyo (JP)

(73) Assignee: DENKA COMPANY LIMITED, Tokyo (JP)

( * ) Notice: Subject to any disclaimer, the term of this patent is extended or adjusted under 35 U.S.C. 154(b) by 0 days.

(21) Appl. No.: 18/026,028

(22) PCT Filed: Sep. 9, 2021

(86) PCT No.: PCT/JP2021/033212
§ 371 (c)(1),
(2) Date: Mar. 13, 2023

(87) PCT Pub. No.: WO2022/054885
PCT Pub. Date: Mar. 17, 2022

(65) Prior Publication Data
US 2023/0365797 A1    Nov. 16, 2023

(30) Foreign Application Priority Data

Sep. 11, 2020 (JP) ................................ 2020-153333
Jun. 9, 2021 (JP) ................................ 2021-096917

(51) Int. Cl.

| | | |
|---|---|---|
| *C08F 210/02* | (2006.01) | |
| *C08F 212/08* | (2006.01) | |
| *C08J 5/18* | (2006.01) | |
| *C08K 7/18* | (2006.01) | |
| *C08L 23/08* | (2025.01) | |

(Continued)

(52) U.S. Cl.
CPC ............ *C08L 25/08* (2013.01); *C08F 210/02* (2013.01); *C08F 212/08* (2013.01); *C08J 5/18* (2013.01); *C08K 7/18* (2013.01); *C08L 23/0838* (2013.01); *H01B 3/441* (2013.01); *C08F 2800/20* (2013.01); *C08J 2323/08* (2013.01); *C08J 2325/08* (2013.01); *C08J 2425/08* (2013.01);

(Continued)

(58) Field of Classification Search
CPC ..... B32B 15/02; B32B 15/082; B32B 15/085; B32B 15/20; B32B 27/18; B32B 27/30; B32B 27/32; B32B 2264/1021; B32B 2264/202; B32B 2270/00; B32B 2307/204; B32B 2307/206; B32B 2307/54; B32B 2307/7265; C08F 210/02; C08F 210/08; C08F 210/34; C08F 257/02; C08F 2800/20; C08F 212/08; C08J 5/18; C08J 2323/08; C08J 2325/08; C08J 2425/08; C08K 3/36; C08K 7/18; C08K 9/00; C08K 2201/006; C08L 23/0838; C08L 25/08; C08L 51/003; C08L 2203/30; C08L 2205/025; H01B 3/44; H01B 3/441; H01B 5/14

See application file for complete search history.

(56) References Cited

U.S. PATENT DOCUMENTS 5,883,213 A    3/1999   Arai et al.
6,500,535 B1  12/2002   Yamada et al.
(Continued)

FOREIGN PATENT DOCUMENTS

CN   101641378 A   2/2010
CN   107531992 A   1/2018
(Continued)

OTHER PUBLICATIONS

Jan. 26, 2024 Search Report issued in European Patent Application No. 21866842.4.
Nov. 26, 2021 Search Report issued in International Patent Application No. PCT/JP2021/033212.
Nov. 16, 2021 Written Opinion issued in International Patent Application No. PCT/JP2021/033212.
Oct. 19, 2024 Office Action issued in Chinese Application No. 202180035790.5.
Feb. 18, 2025 Office Action issued in Korean Patent Application No. 10-2022-7039037.
(Continued)

*Primary Examiner* — Humera N. Sheikh
(74) *Attorney, Agent, or Firm* — Oliff PLC

(57) ABSTRACT

A composition comprises: a resin component including an olefin-aromatic vinyl compound-aromatic polyene copolymer satisfying all the following conditions (1) to (4): (1) a number average molecular weight of the copolymer is 500 or more and 100000 or less; (2) the aromatic vinyl compound monomer is an aromatic vinyl compound having 8 or more and 20 or less carbon atoms, and a content of a unit of the aromatic vinyl compound monomer is 0 mass % or more and 70 mass % or less; (3) the aromatic polyene is one or more selected from polyenes having 5 or more and 20 or less carbon atoms and having a plurality of vinyl groups and/or vinylene groups in the molecule, and a content of the vinyl groups and/or the vinylene groups derived from the unit of the aromatic polyene is 1.5 pieces or more and less than 20 pieces per number average molecular weight; and (4) the olefin is one or more selected from olefins having 2 or more and 20 or less carbon atoms, and a total of units of the olefin monomer, the aromatic vinyl compound monomer, and the aromatic polyene monomer is 100 mass %; and a surface-treated silica. The volume ratio between the resin component and the silica is in the range of 98 to 15:2 to 85. A cured product of the composition has a value of the dielectric tangent obtained by resonator method at a measurement frequency of 10 GHz and/or a measurement frequency range of 25 GHz to 40 GHz of $1.2 \times 10^{-3}$ or less and a storage elastic modulus at 250° C. in the range of 10 MPa or more and 10 GPa or less.

18 Claims, No Drawings

(51) Int. Cl.
*C08L 23/0807* (2025.01)
*C08L 25/08* (2006.01)
*H01B 3/44* (2006.01)

(52) U.S. Cl.
CPC .... *C08K 2201/006* (2013.01); *C08L 2203/30* (2013.01); *C08L 2205/025* (2013.01)

(56) References Cited

U.S. PATENT DOCUMENTS

| | | | |
|---|---|---|---|
| 2004/0039127 | A1 | 2/2004 | Amou et al. |
| 2007/0077413 | A1* | 4/2007 | Amou ................. B32B 5/26 |
| | | | 428/323 |
| 2010/0210760 | A1 | 8/2010 | Kitagawa et al. |
| 2011/0040038 | A1 | 2/2011 | Arai et al. |
| 2018/0127547 | A1 | 5/2018 | Tanigawa et al. |
| 2020/0189922 | A1 | 6/2020 | Watanabe et al. |
| 2022/0169832 | A1* | 6/2022 | Okabe ................. C01B 33/18 |
| 2023/0023832 | A1 | 1/2023 | Arai et al. |
| 2023/0023889 | A1 | 1/2023 | Arai et al. |

FOREIGN PATENT DOCUMENTS

| | | |
|---|---|---|
| CN | 110938238 A | 3/2020 |
| JP | S52-031272 B2 | 8/1977 |
| JP | H06-192392 A | 7/1994 |
| JP | H09-040709 A | 2/1997 |
| JP | H09-309925 A | 12/1997 |
| JP | H11-060645 A | 3/1999 |
| JP | 2003-165718 A | 6/2003 |
| JP | 2004-087639 A | 3/2004 |
| JP | 2009161743 A * | 7/2009 |
| JP | 2010-280771 A | 12/2010 |
| JP | 2010-280860 A | 12/2010 |
| JP | 2013-528558 A | 7/2013 |
| JP | 2018-039995 A | 3/2018 |
| JP | 2019-6879 A | 1/2019 |
| KR | 10-2011-0010724 A | 2/2011 |
| WO | 00/37517 A1 | 6/2000 |
| WO | WO-2011136452 A1 * | 11/2011 ............. C01B 33/18 |
| WO | 2020/195205 A1 | 10/2020 |
| WO | 2021/112087 A1 | 6/2021 |
| WO | 2021/112088 A1 | 6/2021 |
| WO | 2021/215519 A1 | 10/2021 |

OTHER PUBLICATIONS

Apr. 24, 2025 Office Action issued in Chinese Application No. 202180035790.5.

Guangwen Wang, "Practical Technology of Plastic Modification", China Light Industry Press, Mar. 31, 2000.

* cited by examiner

COMPOSITION AND CURED PRODUCT THEREOF

TECHNICAL FIELD

The present invention relates to a composition and a cured product thereof.

BACKGROUND ART

Due to the shift of communication frequency to gigahertz bands and frequency bands higher than those, needs for insulating materials having low dielectric properties have increased. Polyolefins such as polyethylene and aromatic vinyl compound polymers such as polystyrene are known as materials exhibiting excellent low dielectric constant and low dielectric tangent due to having no polar groups in molecular structures. However, due to dependence of the heat resistance on the melting point of crystals or the glass transition temperature, they have a problem in the heat resistance as electric insulator, and due to being thermoplastic resins, they have a problem in a film forming process (Patent Literature 1).

Although fluorine-based resins such as perfluoroethylene have characteristics excellent in low dielectric constant, low dielectric loss and heat resistance, device suitability is low due to difficulty in moldability and film formability. In addition, there is a problem in the adhesive strength with a copper foil of wiring. Meanwhile, although substrates and insulating materials using post-curable resins such as epoxy resins, unsaturated polyester resins, polyimide resins, and phenol resins have been widely used due to the heat resistance and easy handling, improvement is required as insulating materials for high frequencies due to relatively high dielectric constants and dielectric losses (Patent Literature 2).

An electrically insulating material including graft or block copolymer including olefin-based and styrene-based polymer segments has been proposed (Patent Literature 3). The material focuses on the low dielectric constant and low dielectric loss essential to olefin-based or styrene-based hydrocarbon polymers. The production method includes general graft polymerization of commercially available polyethylene and polypropylene with a styrene monomer or a divinylbenzene monomer in the presence of a radical polymerization initiator. Such a method has problems of poor graft efficiency (cross-linking density) and insufficient uniformity of the polymer. Further, the resulting polymer contains a gel, so that there exist problems of poor processability and filling property. The material is a thermoplastic resin having insufficient heat resistance, so that an addition of a heat-resistant resin such as 4-methyl-1-pentene is required. It is therefore difficult to use the material in a molding method including applying the material to a predetermined place or filling a predetermined place with the material and then curing the material.

In Patent Literature 4, an insulating layer including a crosslinked structure containing a hydrocarbon compound having a plurality of aromatic vinyl groups as a cross-linking component is described. The cured product of the cross-linking component specifically described in examples is rigid, so that it is presumed that filling with a large amount of filler is difficult.

In Patent Literature 5, 6 and 7, a cured product obtained from a specific polymerization catalyst, including an ethylene-olefin (aromatic vinyl compound)-polyene copolymer having specific composition and formulation and a non-polar vinyl compound, is shown, and a composition including a general filler such as silica is also described.

Further, addition of filler in forming a resin sheet is known, and filler such as spherical silica is used as described in Patent Literature 8 and 9. However, the effect of the combination of a type of resin and a type of filler has not been sufficiently investigated.

CITATION LIST

Patent Literature

Patent Literature 1: Japanese Patent Publication No. 52-031272
Patent Literature 2: Japanese Patent Laid-Open No. 6-192392
Patent Literature 3: Japanese Patent Laid-Open No. 11-060645
Patent Literature 4: Japanese Patent Laid-Open No. 2004-087639
Patent Literature 5: Japanese Patent Laid-Open No. 2010-280771
Patent Literature 6: Japanese Patent Laid-Open No. 2009-161743
Patent Literature 7: Japanese Patent Laid-Open No. 2010-280860
Patent Literature 8: Japanese Patent Laid-Open No. 2003-165718
Patent Literature 9: Japanese Patent Laid-Open No. 2013-528558

SUMMARY OF INVENTION

Technical Problem

By the conventional techniques described above, a cured product having excellent low dielectric properties required for insulating material used for transmitting high-frequency signals has not been obtained from a thermoplastic composition that may be easily molded. In particular, materials suitable for use in an electronic substrate subjected to a solder reflow process with high temperature exposure are limited. Accordingly, the provision thereof has been desired. The present invention provides a composition of which cured product has excellent low dielectric properties.

Solution to Problem

In other words, the present invention may provide the following aspects.
Aspect 1:
  A composition, comprising:
  a resin component, including an olefin-aromatic vinyl compound-aromatic polyene copolymer satisfying all the following conditions (1) to (4):
  (1) a number average molecular weight of the copolymer is 500 or more and 100000 (one hundred thousand) or less;
  (2) the aromatic vinyl compound monomer is an aromatic vinyl compound having 8 or more and 20 or less carbon atoms, and a content of a unit of the aromatic vinyl compound monomer is 0 mass % or more and 70 mass % or less;
  (3) the aromatic polyene is one or more selected from polyenes having 5 or more and 20 or less carbon atoms and having a plurality of vinyl groups and/or vinylene groups in the molecule, and a content of the vinyl groups and/or the vinylene groups derived from the unit of the aromatic polyene is 1.5 pieces or more and less than 20 pieces per number average molecular weight; and (4) the olefin is one or more selected from the group consisting of olefins having 2 or more and 20 or less carbon atoms, and a total of units of the olefin monomer, the aromatic vinyl compound monomer, and the aromatic polyene monomer is 100 mass %; and a surface-treated silica, wherein a volume ratio between the resin component and the silica is in a range of 98 to 15:2 to 85, a cured product of the composition has a value of dielectric tangent obtained by resonator method at a measurement frequency of 10 GHz and/or a measurement frequency range of 25 GHz to 40 GHz of $1.2 \times 10^{-3}$ or less, and the cured product of the composition has a storage elastic modulus at 250° C. in a range of 10 MPa or more and 10 GPa or less.

Aspect 2:

The composition according to aspect 1, wherein the silica satisfies at least one of the following conditions (a) to (b):

(a) the number of water molecules desorbed at 500° C. to 1000° C. is 0.01 mmol/g or less when a temperature is raised from 25° C. to 1000° C. under a condition of 30° C./min; and (b) a specific surface area is 1 to 30 m²/g.

Aspect 3:

The composition according to aspect 2, wherein when a peak intensity in a range of wave number of 3735 cm1 to 3755 cm$^{-1}$ of silica measured by diffuse reflection FT-IR method is expressed as A, and the peak intensity in a range of wave number of 3660 cm$^{-1}$ to 3680 cm$^{-1}$ is expressed as B, the value of B/A is 3.0 or less.

Aspect 4:

The composition according to any one of aspects 1 to 3, wherein the silica is subjected to surface treatment including heat-treating a raw material silica at a temperature of 500 to 1100° C. for a predetermined time period to satisfy a product of heating temperature [° C.] and heating time [h] of 1000 to 26400 [° C.·h].

Aspect 5:

The composition according to any one of aspects 1 to 4, further comprising one or more monomers selected from the group consisting of an aromatic vinyl compound monomer, an aromatic polyene monomer, and a polar monomer.

Aspect 6:

The composition according to aspect 5, wherein the monomers in an amount of 300 parts by mass or less are contained relative to 100 parts by mass of the copolymer.

Aspect 7:

The composition according to any one of aspects 1 to 6, further comprising a curing agent.

Aspect 8:

The composition according to any one of aspects 1 to 7, wherein the silica is a spherical silica powder.

Aspect 9:

The composition according to any one of aspects 1 to 8, wherein the composition is curable.

Aspect 10:

A molded product of the composition according to any of aspects 1 to 9.

Aspect 11:

The molded product according to aspect 10, being a sheet.

Aspect 12:

A cured product of the molded product according to aspect 10 or 11.

Aspect 13:

The molded product according to aspect 10 or 11, being an electrically insulating material.

Aspect 14:

A laminate, comprising:

a layer containing the composition according to any one of aspects 1 to 9; and a metal foil.

Aspect 15:

A cured product of the laminate according to aspect 14.

Aspect 16:

A single-layer CCL, a multi-layer CCL, a single-layer FCCL or a multi-layer FCCL base material, comprising the cured product according to aspect 12 or 15.

Aspect 17:

A thermoplastic composition, comprising:

a resin component including an olefin-aromatic vinyl compound-aromatic polyene copolymer satisfying all the following conditions (1) to (4):

(1) a number average molecular weight of the copolymer is 500 or more and 100000 (one hundred thousand) or less;

(2) the aromatic vinyl compound monomer is an aromatic vinyl compound having 8 or more and 20 or less carbon atoms, and a content of a unit of the aromatic vinyl compound monomer is 0 mass % or more and 70 mass % or less;

(3) the aromatic polyene is one or more selected from polyenes having 5 or more and 20 or less carbon atoms and having a plurality of vinyl groups and/or vinylene groups in the molecule, and a content of the vinyl groups and/or the vinylene groups derived from the unit of the aromatic polyene is 1.5 pieces or more and less than 20 pieces per number average molecular weight; and (4) the olefin is one or more selected from olefins having 2 or more and 20 or less carbon atoms, and a total of units of the olefin monomer, the aromatic vinyl compound monomer, and the aromatic polyene monomer is 100 mass %; and a surface-treated silica.

Aspect 18:

A molded product of the thermoplastic composition according to aspect 17.

Aspect 19:

The molded product according to aspect 18, in a pellet shape.

Advantageous Effect of Invention

The present invention can provide a composition of which cured product has excellent dielectric properties.

DESCRIPTION OF EMBODIMENT

The present invention is described in more detail below. In the present specification, an olefin-aromatic vinyl compound-aromatic polyene copolymer may be simply referred to as a copolymer. Unless otherwise specified, the numerical range in the specification includes the upper limit value and the lower limit value of the range. In the specification, the term "sheet" also includes the concept of a film. Further, the term "film" described in the specification has the same meaning as a sheet. In the specification, the term "(meth) acrylate" means a concept including an acrylate and a methacrylate.

Compositions

In the present specification, a composition (curable composition) may be referred to as a resin composition or a curable resin composition. A composition of the present invention includes "resin component" including an olefin-aromatic vinyl compound-aromatic polyene copolymer having a formulation in the specific range and the molecular weight range described below. The composition further includes a predetermined amount of a "surface-treated silica". Further, the composition may also include a "monomer" and a "curing agent" described later.

Resin Component

The "resin component" contained in the composition in the present specification includes an olefin-aromatic vinyl compound-aromatic polyene copolymer having a formulation in the specific range and the molecular weight range described below. The resin component may further include other one or more resin compounds, or may include the copolymer alone.

Olefin-Aromatic Vinyl Compound-Aromatic Polyene Copolymer

The olefin-aromatic vinyl compound-aromatic polyene copolymer satisfies all of the following conditions (1) to (4).

(1) The number average molecular weight of the copolymer is 500 or more and 100000 (one hundred thousand) or less, preferably 5000 or more and 100000 or less, more preferably 20000 or more and 100000 or less, and still more preferably 30000 or more and 100000 or less.

(2) The aromatic vinyl compound monomer is an aromatic vinyl compound having 8 or more and 20 or less carbon atoms, and the content of the aromatic vinyl compound monomer unit is 0 mass % or more and 70 mass % or less.

(3) The aromatic polyene is one or more selected from polyenes having 5 or more and 20 or less carbon atoms and having a plurality of vinyl groups and/or vinylene groups in the molecule, and the content of the vinyl groups and/or the vinylene groups derived from the aromatic polyene unit is 1.5 pieces or more and less than 20 pieces, preferably 1.5 pieces or more and less than 7 pieces, more preferably 2 pieces or more and less than 5 pieces, per number average molecular weight.

(4) The olefin is one or more selected from olefins having 2 or more and 20 or less carbon atoms, and the total of the olefin monomer unit, the aromatic vinyl compound monomer unit, and the aromatic polyene monomer unit is 100 mass %.

The olefin-aromatic vinyl compound-aromatic polyene copolymer (hereinafter, simply referred to as "copolymer" in some cases) may be obtained by copolymerizing each of the monomers of an olefin, an aromatic vinyl compound, and an aromatic polyene.

The olefin monomer is one or more selected from α-olefins (alpha olefins) having 2 or more and 20 or less carbon atoms and cyclic olefins having 5 or more and 20 or less carbon atoms, which is a compound composed of carbon and hydrogen, substantially containing no oxygen, nitrogen, or halogen. Examples of the α-olefins having 2 or more and 20 or less carbon atoms include ethylene, propylene, 1-butene, 1-hexene, 1-octene, 1-decane, 1-dodecane, 4-methyl-1-pentene, and 3,5,5-trimethyl-1-hexene. Examples of the cyclic olefin having 5 or more and 20 or less carbon atoms include norbornene and cyclopentene. The olefin is preferably a combination of ethylene and an α-olefin or a cyclic olefin other than ethylene, or ethylene alone. In the case where the olefin is ethylene alone, or the mass ratio α-olefin other than ethylene contained/ethylene is 1/7 or less, more preferably 1/10 or less, the peel strength of the resulting cured product from a copper foil or copper wiring may be favorably increased. Still more preferably, the content of the α-olefin monomer unit other than ethylene contained in the copolymer is 6 mass % or less, most preferably 4 mass % or less, or the olefin is ethylene alone. In this case, the peel strength from a copper foil or copper wiring may be further favorably increased. Further, in a preferred combination of ethylene and an α-olefin other than ethylene, the glass transition temperature of the ethylene-α-olefin-aromatic vinyl compound-aromatic polyene chain of the finally resulting cured product may be freely adjusted in the range of about −60° C. to −10° C.

The aromatic vinyl compound monomer is an aromatic vinyl compound having 8 or more and 20 or less carbon atoms, and examples thereof include styrene, paramethylstyrene, paraisobutylstyrene, various vinylnaphthalenes, and various vinylanthracenes.

The aromatic polyene monomer is a polyene having 5 or more and 20 or less carbon atoms, preferably 8 or more and 20 or less carbon atoms, and having a plurality of vinyl groups and/or vinylene groups (preferably, a vinyl group) in the molecule. The aromatic polyene monomer is preferably a polyene having 8 or more and 20 or less carbon atoms and having a plurality of vinyl groups in the molecule, being more preferably various (ortho, meta, and para) divinylbenzenes or a mixture thereof, and a compound composed of carbon and hydrogen, substantially containing no oxygen, nitrogen, or halogen, having an aromatic vinyl structure such as divinylnaphthalene, divinylanthracene, p-2-propenylstyrene, and p-3-butenylstyrene. Alternatively, a bifunctional aromatic vinyl compound described in Japanese Patent Laid-Open No. 2004-087639, for example, 1,2-bis(vinylphenyl)ethane (abbreviation: BVPE) may be used. Among these, various (ortho, meta and para) divinylbenzenes, or mixtures thereof are preferably used, and a mixture of meta and paradivinylbenzene is most preferably used. In the specification, these are referred to as divinylbenzenes. Use of divinylbenzenes as the aromatic polyene is preferred, because the curing efficiency is high in a curing process to achieve easy curing.

Each of the monomers of the olefin, aromatic vinyl compound, and aromatic polyene may further include an olefin containing a polar group such as an oxygen atom, a nitrogen atom, etc., an aromatic vinyl compound containing an oxygen atom, a nitrogen atom, etc., or an aromatic polyene containing an oxygen atom, a nitrogen atom, etc. However, the total mass of the monomers containing these polar groups is preferably 10 mass % or less, more preferably 3 mass % or less, relative to the total mass of the composition, and it is most preferable that no monomers containing a polar group be contained. By setting the content of the monomers to 10 mass % or less, the low dielectric property (low dielectric constant/low dielectric loss) of the cured product obtained by curing the composition may be improved.

The number average molecular weight of the copolymer is 500 or more and 100000 or less, preferably 5000 or more and 100000 or less, more preferably 20000 or more and 100000 or less, and still more preferably 30000 or more and 100000 or less. Within such a range, addition of an additive resin described below into an uncured state improves the thermoplasticity without stickiness, and easily imparts good physical properties such as high strength at break and high elongation at break to a finally resulting cured product. With a number average molecular weight of less than 500, the composition at the uncured stage has low mechanical properties and high stickiness, so that the composition may be difficult to be molded as a thermoplastic resin. With a number average molecular weight of higher than 100000, the moldability may decrease. The content of the aromatic vinyl compound monomer unit contained in the copolymer is 0 mass % or more and 70 mass % or less, preferably 10 mass % or more and less than 70 mass % or less, and more preferably 10 mass % or more and 60 mass % or less, and still more preferably 10 mass % or more and 55 mass % or less. With a content of the aromatic vinyl compound monomer unit of more than 70 mass %, the glass transition temperature of the cured product of a finally resulting composition is in the vicinity of room temperature, and the toughness and elongation at low temperatures may decrease. With a content of the aromatic vinyl compound monomer unit of 10 mass % or more, the aromaticity of the copolymer is improved, the compatibility with a flame retardant and a filler is improved, and filling with the filler may be performed without bleeding out of the flame retardant. Further, with a content of the aromatic vinyl compound monomer unit of 10 mass % or more, a cured product of the composition having high peel strength from a copper foil or copper wiring may be obtained.

In the copolymer, the content of the vinyl group and/or vinylene group derived from an aromatic polyene unit is 1.5 pieces or more and less than 20 pieces, preferably 1.5 pieces or more and less than 7 pieces, and more preferably 2 pieces or more and less than 5 pieces, per number average molecular weight. The content of vinyl group and/or vinylene group may be collectively referred to as "vinyl group content" in the following. When the vinyl group content is less than 1.5 pieces, the cross-linking efficiency is low, and it becomes difficult to obtain a cured product having a sufficient cross-linking density. With increase in the vinyl group content, it becomes easy to improve the mechanical properties of the finally resulting cured product at normal temperature and high temperature. The content of the vinyl group derived from the aromatic polyene unit (divinylbenzene unit) per number average molecular weight in the copolymer may be obtained by comparing the number average molecular weight (Mn) in terms of standard polystyrene obtained by GPC (gel permeation chromatography) method known to those skilled in the art with the vinyl group content and the vinylene group content derived from the aromatic polymer unit obtained by $^1$H-NMR measurement. As an example, in the case where the vinyl group content derived from the aromatic polyene unit (divinylbenzene unit) in the copolymer is 0.095 mass % resulting from comparison of the intensity of each peak area obtained by $^1$H-NMR measurement, and the number average molecular weight in terms of standard polystyrene by GPC measurement is 68000, the molecular weight of the vinyl group derived from the aromatic polyene unit in the number average molecular weight is 64.8, which is the product of these. The product is divided by 27, which is the formula weight of the vinyl group, to obtain 2.4. That is, the content of vinyl group derived from the aromatic polyene unit per number average molecular weight in the copolymer is 2.4 pieces. The attribution of peaks obtained by $^1$H-NMR measurement of the copolymer is known in literature. Further, a method for obtaining the composition of the copolymer from the comparison of the peak areas obtained by $^1$H-NMR measurement is also known. In a secondary manner, the peak areas of $^{13}$C-NMR spectrum measured in a known quantitative mode and the ratio thereof may be employed. Further, in the specification, the content of the divinylbenzene unit in the copolymer is determined from the peak intensity of the vinyl group derived from the divinylbenzene unit (according to $^1$H-NMR measurement). That is, from the content of the vinyl group derived from the divinylbenzene unit, the content of the divinylbenzene unit is determined by assuming that one piece of vinyl group is derived from one piece of divinylbenzene unit in the copolymer.

In the copolymer, the content of the olefin monomer unit is preferably 30 mass % or more, and particularly preferably 45 mass % or more. The total of the olefin monomer unit, the aromatic vinyl compound monomer unit, and the aromatic polyene monomer unit is 100 mass %. With an olefin monomer unit content of 30 mass % or more, the toughness (elongation) of the finally resulting cured product is improved, resulting in no cracks during curing, no decrease in impact resistance of the cured product, and no occurrence of cracks of the cured product during a heat cycle test. In the copolymer, the preferred olefin monomer unit content is 90 mass % or less.

In the copolymer, preferred specific examples of the olefin-aromatic polyene copolymer containing no aromatic vinyl compound monomer unit include an ethylene-divinylbenzene copolymer, an ethylene-propylene-divinylbenzene copolymer, an ethylene-1-butene-divinylbenzene copolymer, an ethylene-1-hexene-divinylbenzene copolymer, and an ethylene-1-octene-divinylbenzene copolymer.

In the copolymer, examples of the olefin-aromatic vinyl compound-aromatic polyene copolymer containing an aromatic vinyl compound monomer unit include an ethylene-styrene-divinylbenzene copolymer, an ethylene-propylene-styrene-divinylbenzene copolymer, an ethylene-1-hexene-styrene-divinylbenzene copolymer, and an ethylene-1-octene-styrene-divinylbenzene copolymer. The copolymer for use in the present invention may be produced, for example, by a production method described in International Publication No. WO 00/37517, Japanese Patent Laid-Open No. 2009-161743 or Japanese Patent Laid-Open No. 2010-280771.

Resins Other than Copolymer Contained in Resin Component

In the resin component of the composition, a resin compound other than the copolymers (hereinafter, also referred to as "additive resin") may be further contained. As the additive resin, any may be used as long as the effect of the composition is not impaired, and one or more selected from the group consisting of a hydrocarbon-based elastomer, a polyphenylene ether and an aromatic polyene-based resin may be preferably used. Among them, a polyphenylene ether or a hydrocarbon-based elastomer is more preferred. Among the hydrocarbon-based elastomers, conjugated diene-based polymers are preferred. Among the conjugated diene-based polymers, 1,2-polybutadiene is preferred. Use of one or more selected from the group consisting of a hydrocarbon-based elastomer, a polyphenylene ether, and an aromatic polyene-based resin has effect for reducing the amount of monomers used. For example, a cured product of the present invention may be obtained without using a monomer. The total amount of the resins added may be preferably 1 to 500 parts by mass, more preferably 1 to 300 parts by mass, relative to 100 parts by mass of the copolymer.

Hydrocarbon-Based Elastomers

The amount of the hydrocarbon-based elastomer is preferably 1 to 500 parts by mass, more preferably 1 to 200 parts by mass relative to 100 parts by mass of the copolymer. The hydrocarbon-based elastomer that may be suitably used in the composition of the present invention may have a number average molecular weight of 20000 or more, preferably 30000 or more. Examples of the hydrocarbon-based elastomer include ethylene-based and propylene-based elastomers, and one or a plurality of elastomers selected from conjugated diene-based polymers, aromatic vinyl compounds-conjugated diene-based block copolymers or random copolymers, and hydrides (hydrogenated product) thereof. Examples of the ethylene-based elastomer include an ethylene-α-olefin copolymer such as an ethylene-octene copolymer and ethylene-1-hexene copolymer, EPR and EPDM. Examples of the propylene-based elastomer include an atactic polypropylene, a polypropylene having low stereoregularity, and a propylene-α-olefin copolymer such as propylene-1-butene copolymer.

Conjugated Diene-Based Polymer

Examples of the conjugated diene polymer include polybutadiene and 1,2-polybutadiene. Examples of the aromatic vinyl compound-conjugated diene-based block copolymer or random copolymer, and a hydride (hydrogenated product) thereof include SBS, SIS, SEBS, SEPS, SEEPS, and SEEBS. The 1,2-polybutadiene that may be preferably used may be obtained, for example, as a product of JSR Corporation, or may be obtained as a liquid polybutadiene from Nippon Soda Co., Ltd., under product name of B-1000, B-2000 or B-3000. Further, examples of the copolymer containing a 1,2-polybutadiene structure that may be preferably used include "Ricon 100" manufactured by TOTAL Cray Valley. In the case where one or a plurality of resins selected from these hydrocarbon-based elastomers are in a liquid state (approximately 300000 mPa·s or less) at room temperature (25° C.), the amount thereof used is preferably in the range of 1 to 30 parts by mass, particularly preferably 1 to 20 parts by mass relative to 100 parts by mass of the copolymer, from the viewpoint of handleability and moldability of the composition of the present invention in an uncured state (handleability as a thermoplastic resin).

Polyphenylene Ether

As the polyphenylene ether, a commercially available known polyphenylene ether may be used. The number average molecular weight of the polyphenylene ether is optional, preferably 10000 or less, and most preferably 5000 or less, in consideration of the moldability of the composition. The number average molecular weight may be preferably 500 or more. Further, in the case of addition for the purpose of curing the composition of the present invention, it is preferable that the molecular end be modified with a functional group, and/or a plurality of functional groups be contained in one molecule. Examples of the functional group include an allyl group, a vinyl group and an epoxy group. As the functional group, a radically polymerizable functional group is preferred. As the radically polymerizable functional group, a vinyl group is preferred. As the vinyl group, one or more selected from the group consisting of an allyl group, a (meth)acryloyl group and an aromatic vinyl group are preferred, a (meth)acryloyl group or an aromatic vinyl group is more preferred, and an aromatic vinyl group is most preferred. That is, in the composition of the present invention, a bifunctional polyphenylene ether having a molecular chain modified with radically polymerizable functional groups at both ends is particularly preferred. Examples of such a polyphenylene ether include Noryl (trademark) SA9000 manufactured by SABIC (a modified polyphenylene ether having a methacryloyl group at both ends, number average molecular weight: 2200), and a bifunctional polyphenylene ether oligomer manufactured by Mitsubishi Gas Chemical Company, Inc. (OPE-2St, a modified polyphenylene ether having a vinylbenzene group at both ends, number average molecular weight: 1200). Among them, the bifunctional polyphenylene ether oligomer manufactured by Mitsubishi Gas Chemical Company, Inc. (OPE-2St) is particularly preferably used. The amount of the polyphenylene ether used in the composition of the present invention is preferably 1 to 500 parts by mass, more preferably 1 to 300 parts by mass, and still more preferably 1 to 200 parts by mass, relative to 100 parts by mass of the copolymer.

The method for determining the number average molecular weight of the copolymers and other polymers is as follows. The molecular weight may be determined as number average molecular weight (Mn) in terms of standard polystyrene by GPC (gel permeation chromatography). The measurement may be performed under the following conditions.

In the case of a number average molecular weight of 1000 or more:
  Column: Two TSKgel Multipore HXL-M having a diameter of 7.8 mm and a length of 300 mm (manufactured by Tosoh Corporation) are connected in series for use.
  Column temperature: 40° C.
  Solvent: THF
  Liquid flow rate: 1.0 ml/min
  Detector: RI detector In the case of a number average molecular weight of less than 1000:
  Column: One TSKgelG3000HXL having a diameter of 7.8 mm and a length of 300 mm, one TSKgelG2000HXL having a diameter of 7.8 mm and a length of 300 mm, and four TSKgelG1000HXL having a diameter of 7.8 mm and a length of 300 mm (manufactured by Tosoh Corporation) are connected in series for use.
  Column temperature: 40° C.
  Solvent: THF
  Liquid flow rate: 0.5 ml/min
  Detector: RI detector Aromatic Polyene-Based Resins The aromatic polyene-based resin includes a divinylbenzene-based reactive multi-branched copolymer manufactured by NIPPON STEEL Chemical & Material Co., Ltd. Such a divinylbenzene-based reactive multi-branched copolymer is described, for example, in literature "Synthesis of polyfunctional aromatic vinyl copolymers and development of novel IPN-type low dielectric loss material using the same," (M. Kawabe et al., Journal of The Japan Institute of Electronics Packaging, p. 125, Vol. 12, No. 2 (2009)), U.S. Pat. No. 8,404,797, and International Patent No. WO 2018/181842. Further, examples of the aromatic polyene-based resin also include an aromatic polyene polymer resin containing the above-mentioned aromatic polyene monomer as a main constituent unit. Use of the aromatic polyene-based resin in an amount in the ranges is effective for adjusting the mechanical properties of the cured product obtained from the composition, and preferable for preventing reduction in adhesion with other members and reduction in toughness. A formulation with an amount used more than the ranges may cause brittleness or reduction in adhesion with other members.

Curing Agents

As the curing agent that may be contained in the composition, a known curing agent that may be conventionally used for polymerization or curing of aromatic polyenes and aromatic vinyl compounds may be used. Examples of such a curing agent include a radical polymerization initiator, a cationic polymerization initiator, and an anionic polymerization initiator, and a radical polymerization initiator may be preferably used. Preferably, the curing agent is an organic peroxide-based (peroxide) or azo-based polymerization initiator, which may be freely selected depending on the application and conditions. Catalogs showing organic peroxides may be downloaded from the following NOF CORPORATION websites.

https://www.nof.co.jp/business/chemical/product01a.html
https://www.nof.co.jp/business/chemical/product01b.html
https://www.nof.co.jp/business/chemical/product01c.html The organic peroxide is also described in the catalogs of FUJIFILM Wako Pure Chemical Corporation and Tokyo Chemical Industry Co., Ltd. The curing agent used in the present invention may be obtained from these companies. Further, a known photopolymerization initiator using light, ultraviolet rays, or radiation may also be used as the curing agent. Examples of the curing agent using the photopolymerization initiator include a photo radical polymerization initiator, a photo cationic polymerization initiator, and a photo anionic polymerization initiator. Such a photopolymerization initiator may be obtained from, for example, Tokyo Chemical Industry Co., Ltd. Furthermore, curing may be performed by radiation or electron beam itself. Alternatively, cross-linking and curing may be performed by thermal polymerization of the raw materials contained without a curing agent.

The amount of the curing agent used is not particularly limited, and in general preferably 0.01 to 10 parts by mass relative to 100 parts by mass of the composition (it is preferable that a curing agent and a solvent are removed). In the case where a curing agent such as peroxide-based (peroxide) or azo-based polymerization initiator is used, the curing treatment is performed at an appropriate temperature and time in consideration of the half-life thereof. The conditions in this case are optional according to the curing agent, and in general, a temperature range of about 50° C. to 180° C. is suitable.

Monomers

The amount of monomers that the composition of the present invention may contain is optional, preferably 300 parts by mass or less relative to 100 parts by mass of the copolymer. Incidentally, the composition may contain substantially no monomers. In the case where a monomer is contained, a content of 1 part by mass or more is preferred, and 5 parts by mass or more is more preferred. With an amount of monomers of 300 parts by mass or less, the uncured composition has no viscous property, and easy moldability as a thermoplastic resin is achieved. Further, with a content of easily volatile monomers below a certain level, the odor at the uncured stage causes no problem. In the case where a solvent is added to a composition to take a product form in varnish form, there is a problem that monomers are lost as the solvent evaporates during use, so that substantial monomer content tends to decrease. Further, in the case where the product form is an uncured sheet, with a certain amount or less of monomers contained, change in the monomer content during storage hardly occurs. The monomer that may be suitably used in the composition of the present invention has a molecular weight of preferably less than 1000, more preferably less than 500. Monomers that may be suitably used in the composition of the present invention are aromatic vinyl compound monomers, aromatic polyene monomers, and/or polar monomers. As the monomers, monomers that may be polymerized with a radical polymerization initiator are preferred, and one or more selected from the group consisting of aromatic vinyl compounds and aromatic polyenes are more preferred. Further, BVPE (1,2-bis(vinylphenyl)ethane) described in Japanese Patent Laid-Open No. 2003-212941 may also be preferably used.

The amount of the monomer used may be, for example, as follows. From the viewpoint of enhancing the mechanical strength (elastic modulus) of the cured product at high temperature, the aromatic vinyl compound is preferably in an amount of 50 parts by mass or more and 250 parts by mass or less, and more preferably in an amount of 80 parts by mass or more and 200 parts by mass or less, relative to 100 parts by mass of the copolymer. From the viewpoint of enhancing the mechanical strength (elastic modulus) of a cured product at high temperature, the amount of aromatic polyene is preferably 1 part by mass or more and 30 parts by mass or less relative to 100 parts by mass of the copolymer. In the case where an aromatic vinyl compound and an aromatic polyene are used, the mass ratio between the aromatic vinyl compound and the aromatic polyene in 100 parts by mass in total of the aromatic vinyl compound and the aromatic polyene, i.e. aromatic vinyl compound:aromatic polyene, is preferably 70 to 99:1 to 30, more preferably 85 to 95:5 to 15.

Preferably, a relatively small amount of polar monomer may be used for the purpose of imparting adhesiveness to other materials required as an insulating material and imparting or adjusting the mechanical properties of the cured product. Examples of the above-mentioned polar monomer include various maleimides, bismaleimides, maleic anhydride, glycidyl (meth)acrylate, triallyl isocyanurate, tri(meth)acrylic isocyanurate, and trimethylolpropane tri(meth)acrylate. Maleimides and bismaleimides that may be used in the present invention are described in, for example, International Publication No. WO 2016/114287 and Japanese Patent Application Laid-Open No. 2008-291227, and may be purchased from, for example, Daiwa Kasei Industry Co., Ltd. or Designer Molecules Inc. Alternatively, these maleimide group-containing compounds may be used as polyamino bismaleimide compounds, from the viewpoints of solubility in an organic solvent, high frequency properties, high adhesiveness to a conductor, moldability of a prepreg, etc. The polyaminobismaleimide compound may be obtained, for example, from a Michael addition reaction of a compound having two maleimide groups at a terminal and an aromatic diamine compound having two primary amino groups in a molecule. For obtaining high cross-linking efficiency with a small amount of addition, it is preferable to use a polar monomer having a polyfunctional group containing two or more functional groups, and examples thereof include bismaleimides, triallyl isocyanurate (TAIC), and trimethylolpropane tri(meth)acrylate. The amount of the polar monomer that may be contained in the composition is in the range of 0.1 to 30 parts by mass, preferably 0.1 to 10 parts by mass, relative to 100 parts by mass of the copolymer. By using 30 parts by mass or less, the dielectric constant and dielectric tangent of the resulting cured product is reduced. For example, the dielectric constant may be suppressed to 3.5 or less, preferably 3.0 or less, and the dielectric tangent may be suppressed to $1.2 \times 10^{-3}$ or less, preferably $1.1 \times 10^{-3}$ or less.

Solvent

An appropriate solvent may be added to the composition of the present invention on an as needed basis. The solvent is used to adjust the viscosity and fluidity of the composition. The solvent is preferably volatile, and, for example, cyclohexane, toluene, ethylbenzene, acetone or isopropanol is used. The amount used is preferably 10 parts by mass or less relative to 100 parts by mass of the copolymer of the present invention from the viewpoint of moldability and handling of the composition before curing as a thermoplastic resin, and it is more preferable that substantially no solvent be used from the viewpoint of removal during curing and after curing. Substantially no solvent used means preferably 5 parts by mass or less, more preferably 1 part by mass or less, and most preferably 0 parts by mass. In particular, in the case of using as a varnish, it is preferable to add an appropriate solvent to the composition of the present invention. The solvent is used to adjust the viscosity and fluidity of the composition as a varnish. As the solvent, a solvent having a boiling point of a certain level or more is preferred, because an applied film having a uniform thickness is obtained with a solvent having a high boiling point under atmospheric pressure, that is, having a low volatility. The preferred boiling point is 100° C. or more, more preferably 110° C. or more and 300° C. or less, under atmospheric pressure. Examples of the solvent suitably used for a varnish include cyclohexane, toluene, xylene, mesitylene, tetralin, acetone, ethylbenzene, limonene, a mixed alkane, a mixed aromatic-based solvent, ethylene glycol methyl ether acetate, ethylene glycol monoethyl ether acetate, and ethylene glycol monobutyl ether. The amount used is in the range of preferably 10 to 2000 parts by mass, more preferably 5 to 500 parts by mass, and still more preferably 10 to 300 parts by mass, relative to 100 parts by mass of the composition of the present invention.

Surface-Treated Silica

The composition comprises a surface-treated silica together with the resin composition. As the silica, a surface-treated spherical silica powder is preferred. Hereinafter, the silica may be also referred to as spherical silica powder. The volume ratio between the resin component and the spherical silica powder may be in the range of 98 to 15:2 to 85, preferably 85 to 15:15 to 85, more preferably 75 to 25:25 to 75, and still more preferably 60 to 40:40 to 60.

The silica contained in the present composition refers to one having a dielectric tangent reduced by surface-treating raw material silica. Examples of such a surface treatment include heat treatment and treatment with various coupling agents including a silane coupling agent. Preferably, as the surface treatment, the methods described in International Publication No. WO 2020/195205 and pending International Application PCT/JP2021/016377 by the present applicant may be used. In a preferred embodiment, a spherical silica powder may be used as silica, and the surface treatment applied to the silica may include heat-treating the raw material silica at a temperature of 500 to 1100° C., preferably 500 to 1000° C., for a predetermined time period to satisfy a product of heating temperature (° C.) and heating time (h) of 1000 to 26400 (° C.·h), preferably 1800 to 17600 (° C.·h). It is preferable that the treatment be performed while flowing the raw material silica powder in an inert atmosphere (nitrogen, argon, etc.). The temperature and time of the treatment are selected such that the resulting silica satisfies preferably at least one, more preferably both, of the following conditions (a) to (b):

(a) the number of water molecules desorbed at 500° C. to 1000° C. is 0.01 mmol/g or less when the temperature is raised from 25° C. to 1000° C. under a condition of 30° C./min; and (b) the specific surface area is 1 to 30 m²/g, preferably 3 to 10 m²/g.

With the conditions being satisfied, mixing with a resin component is easy, and an effect for reducing the dielectric tangent may be obtained. Further, when the peak intensity in a range of wave number of 3735 cm⁻¹ to 3755 cm⁻¹ of silica measured by diffuse reflection FT-IR method is expressed as A, and the peak intensity in a range of wave number of 3660 cm⁻¹ to 3680 cm⁻¹ is expressed as B, the value of B/A may preferably be 3.0 or less.

In the case where a spherical silica powder is used as silica, the average particle size (d50) of the spherical silica powder is preferably 0.01 to 100 µm, more preferably 0.1 to 10 and most preferably 0.3 to 1 The d50 is a value at a cumulative volume of 50%.

The silica immediately after surface treatment may be subjected to natural cooling in a furnace. After being cooled to 200° C. or lower, the silica may be dried in a vacuum dryer, and then collected in a moisture-proof aluminum bag.

Any method may be used for producing the raw material silica, and examples thereof include a powder melting method for producing a spherical silica powder including passing silica through a high temperature range higher than the melting point for spheroidizing.

The density (true specific gravity) of silica is preferably 1.8 to 2.4 g/cm³. Within the range, an appropriate amount of voids in the silica particle and an appropriate silica crystal structure are obtained, so that an effect for appropriately suppressing the coefficient of thermal expansion may be obtained. Examples of the fused silica include SFP-130MC manufactured by Denka Company Limited.

In the case where a spherical silica powder is used as silica, the average circularity of the spherical silica powder may be preferably 0.85 or more, more preferably 0.90 or more. With an average circularity of 0.85 or more, the viscosity does not increase too much when mixed with a resin component and the fluidity hardly decreases, so that the processability and the filling property are improved. Further, as silica, a spherical silica powder and another silica (preferably fused silica) may be used in combination. Preferably, by mixing silica with the composition to form an uncured or semi-cured molded product, the effect for reducing water adsorption to silica may also be obtained.

Other Fillers

Further, a known inorganic or organic filler other than the surface-treated silica may be added on an as needed basis. These fillers are added for the purpose of controlling the coefficient of thermal expansion, controlling the thermal conductivity, and reducing the cost, and the amount added thereof is optional depending on the purpose. The composition of the present invention may contain a large amount of inorganic filler, in particular, and the amount added thereof may reach 2000 parts by mass relative to 100 parts by mass of the copolymer. In particular, in the case of adding an inorganic filler, it is preferable to use a known surface modifier, for example, a silane coupling agent. In particular, for the purpose of producing a composition excellent in low dielectric constant and low dielectric loss, which is one of the objects of the present invention, boron nitride (BN) is preferred as the inorganic filler. From the viewpoint of low dielectric properties, since the dielectric constant may increase high with a large amount of addition or compounding, in particular, the filler in amount of preferably less than 500 parts by mass, more preferably less than 400 parts by mass, relative to 100 parts by mass of the copolymer, is used. In order to improve the low dielectric properties (low dielectric constant and low dielectric loss tangent), a hollow filler or a filler having a shape with many voids may be added.

Alternatively, an organic filler such as high molecular weight polyethylene or ultra-high molecular weight polyethylene may be used instead of inorganic fillers. It is preferable that the organic filler be crosslinked by itself from the viewpoint of heat resistance, and it is preferable that the organic filler be compounded in a form of fine particles or powder. These organic fillers also may suppress the increase in dielectric constant and dielectric tangent.

Meanwhile, in the composition of the present invention, a high dielectric constant insulating filler having a dielectric constant at 1 GHz of preferably 3 to 10000, more preferably 5 to 10000, may be mixed and dispersed to prepare an insulating cured product having a high dielectric constant insulating layer having a dielectric constant of preferably 2.5 to 20, more preferably 2.8 to 10, with suppressed increase in dielectric tangent (dielectric loss). With increase in the dielectric constant of the film made of insulating cured product, downsizing of a circuit and increase in capacity of a capacitor may be achieved, which contribute to downsizing of electric components for high frequencies. The high dielectric constant and low dielectric tangent insulating layer is suitable for applications such as capacitors, inductors for resonant circuits, filters, and antennas. Examples of the high dielectric constant insulating filler used in the present invention include inorganic fillers and insulated metal particles. Specific examples include known high dielectric constant inorganic fillers such as barium titanate and strontium titanate, and other examples are specifically described in, for example, Japanese Patent Application Laid-Open No. 2004-087639.

Other Additives

The composition may further contain one or more selected from flame retardants and surface modifiers. The composition of the present invention may be a matrix of cured products and may have excellent filling properties of other materials when cured, so that even after curing, a cured product of the composition containing one or more selected from these fillers, flame retardants and surface modifiers easily exhibits impact resistance and toughness. Further, the composition may contain known additives generally added to a resin, such as heat stabilizers, ultraviolet absorbers, antioxidants, lubricants, colorants, pigments, etc., within a range satisfying the effects of the present invention.

Flame Retardants

A known flame retardant may be used in the composition of the present invention. Preferred flame retardants are known organic phosphorus-based flame retardants such as phosphoric acid esters or condensates thereof, known bromine-based flame retardants, and red phosphorus, from the viewpoint of maintaining low dielectric constant and low dielectric tangent. In particular, among phosphoric acid esters, a compound having a plurality of xylenyl groups in the molecule is preferred from the viewpoint of flame retardancy and low dielectric tangent property.

In addition to the flame retardants, flame retardant aids including antimony compounds such as antimony trioxide, antimony tetroxide, antimony pentoxide and sodium antimonate, or nitrogen-containing compounds such as melamine, triallyl-1,3,5-triazine-2,3,4-(1H,3H,5H)-trione, and 2,4,6-triallyloxy-1,3,5-triazine may be added. In general, the total amount of these flame retardants and flame retardant aids is preferably 1 to 100 parts by mass relative to 100 parts by mass of the composition. Alternatively, 30 to 200 parts by mass of the polyphenylene ether (PPE)-based resin excellent in low dielectric constant and flame retardancy may be used relative to 100 parts by mass of the flame retardant.

Surface Modifiers

The composition of the present invention may contain various surface modifiers for the purpose of improving adhesion to fillers, copper plates, and wiring. The amount of the surface modifier used is preferably 0.01 to 10 parts by mass, more preferably 0.1 to 5 parts by mass, relative to 100 parts by mass of the composition of the present invention other than the surface modifier, or 100 parts by mass of the filler. Examples of the surface modifier include various silane coupling agents and titanate-based coupling agents. One or a plurality of various silane coupling agents and titanate-based coupling agents may be used.

In the present invention, by changing the compounding ratio of the copolymer, silica, monomer, additive resin, and solvent on an as needed basis, of the composition within the above range, or further, by changing the compounding ratio of the flame retardant, filler, and surface modifier, the fluidization temperature of the curable resin or the composition may be adjusted according to the purpose and molding method. Specifically, the composition of the present invention may take various product forms such as "thermoplastic composition", "semi-cured state (i.e., B stage sheet or the like)", and "varnish".

As described above, the composition of the present invention may be obtained by mixing/dissolving or melting one or more selected from a copolymer, a silica, a curing agent, and on an as needed basis, a monomer, a solvent, an additive resin, a filler, a flame retardant, and a surface modifier. Further, the composition of the present invention may contain additives usually used for resins, such as antioxidants, weathering agents, light stabilizers, lubricants, compatibilizers, antistatic agents, etc., as long as the effects and purposes of the present invention are not impaired. Any known method may be adopted as the method of mixing, dissolving and melting these.

Thermoplastic Compositions and Molded Products

In the case where the composition of the present invention uses a copolymer having a molecular weight in the range above a certain level and contains the predetermined additive resin, the properties of a thermoplastic resin may be exhibited. Therefore, under conditions not causing cross-linking, the composition may be molded into a shape such as sheet, tube, strip and pellet, in a substantially uncured state by a known molding method for a thermoplastic resin. The molded product may be then cross-linked (i.e., cured).

The preferred embodiment of the present composition is as follows. In the case where the composition contains more than a certain percentage of one or a plurality of resins selected from the hydrocarbon-based elastomer, polyphenylene ether, olefin-aromatic vinyl compound-aromatic polyene copolymerized oligomer, and aromatic polyene-based resin, excluding resins in a liquid state at room temperature, the molding in an uncured state as thermoplastic resin is easy as well. Specifically, the hydrocarbon-based elastomer (excluding resins in liquid state) and/or polyphenylene ether in the range of 30 to 200 parts by mass relative to 100 parts by mass of the copolymer may be added. In the case where the additive resin is in a liquid state at room temperature, the amount added may be in the range of preferably 1 to 30 parts by mass, particularly preferably 1 to 20 parts by mass relative to 100 parts by mass of the copolymer. The amount of the monomer used in the present thermoplastic composition may be preferably 10 parts by mass or less relative to 100 parts by mass of the copolymer. The number average molecular weight of the copolymer used is 500 or more and 100000 (one hundred thousand) or less, preferably 20000 or more and 100000 or less, and more preferably 30000 or more and 100000 or less. The thermoplastic composition is molded into various shapes such as a sheet in advance by taking advantage of the thermoplasticity at a temperature equal to or lower than the working temperature of the curing agent, and may be cured by heating after combining with a semiconductor device, wiring, or a substrate and a laminate, on an as needed basis, so as to achieve adhesion.

In a preferred embodiment, the thermoplastic composition of the present invention containing surface-treated silica is preliminarily formed into a molded body (either an uncured or semi-cured molded body) to obtain an advantage that an increase in the dielectric constant and the dielectric tangent due to water absorption of silica (adsorption of water) is easily suppressed. The molded product is preferably in a sheet or pellet shape. Such a molded product is also useful as a masterbatch, and particularly in the case of a pellet shape, an masterbatch suitable for adding a surface-treated silica to another material may be obtained.

The composition of the present invention may be provided as a sheet by molding a composition melted by heating at a temperature equal to or less than the working temperature or the decomposition temperature of the curing agent by a known method. Alternatively, the sheet may be molded by extrusion molding with a T-die, double rolling, or extrusion lamination to a base film. In this case, the formulation of the composition and the mass ratio copolymer/monomer, or the solvent, the additive resin, and the flame retardant are selected and adjusted, such that melting is performed at a temperature equal to or less than the working temperature or the decomposition temperature of the curing agent and solidification occurs in the vicinity of room temperature. The sheet in this case is in a substantially uncured state. Then, through various processing and assembling steps, finally, complete curing is performed for a processing time at a temperature equal to or more than the working temperature or the decomposition temperature of the curing agent. Such a method is a general technique used for an ethylene-vinyl acetate resin-based cross-linked sealant sheet of a solar cell (solar power generation device).

Molded Products in Semi-Cured State (e.g., B Stage Sheets)

Further, the composition of the present invention may be also made into a molded product such as a sheet and a tube in a partially cross-linked state, for example, with a part of the curing agent contained therein being reacted to a semi-cured state (so-called "B-stage state"). For example, semi-curing is achieved by adopting a plurality of curing agents having different curing temperatures and/or curing conditions, so that the melt viscosity and fluidity may be controlled to make the B stage state. That is, by a first stage curing (partial curing), the present curable resin or composition is formed into an easy-to-handle B stage sheet, which is laminated on an electronic device or a substrate to be pressure-bonded. Then, a second stage curing (complete curing) may be performed to obtain a final shape. In this case, the formulation of the composition, that is, the mass ratio copolymer/monomer, is selected, and on an as needed basis, a solvent, an additive resin, and a flame retardant are added. Then, the composition further containing a curing agent such as a peroxide is partially cured and adjusted to a sheet form (in the B-stage state). After a device is molded and assembled, complete curing is performed by heating under pressure. As a method for partially curing the composition, a known method may be adopted. For example, according to the method, peroxides having different decomposition temperatures are used in combination. A semi-cured sheet is obtained through a treatment at a temperature at which only one of them substantially acts for a predetermined time. Finally, through a treatment at a temperature at which all the curing agents act for a sufficient time, complete curing is performed.

Further, the molded product may be a sheet. The sheet may be uncured (semi-cured) to an extent that the sheet form can be maintained, or may be completely cured. The degree of curing of the composition may be quantitatively measured by a known dynamic mechanical analysis (DMA).

Compositions in Varnish Form and Molded Products Thereof

The composition of the present invention may be also in a varnish form in viscous liquid state depending on the composition and compounding ratio. For example, by using a sufficient amount of solvent and/or by using an appropriate amount of a liquid monomer, a varnish form may be obtained. In particular, for use as a varnish, it is preferable to add an appropriate solvent to the composition of the present invention. The solvent is used to adjust the viscosity and fluidity of the composition as a varnish. A solvent having a boiling point at a certain level or more is preferred, because the solvent having a high boiling point under atmospheric pressure, that is, low volatility, allows a uniform thickness of the applied film to be produced. The preferred boiling point is approximately 110° C. or more and 300° C. or less, under atmospheric pressure. Examples of the solvent suitably used for a varnish include toluene, xylene, mesitylene, ethylbenzene, limonene, ethylene glycol methyl ether acetate, ethylene glycol monoethyl ether acetate, and ethylene glycol monobutyl ether. The amount used is preferably in the range of 10 to 2000 parts by mass relative to 100 parts by mass of the composition of the present invention.

The varnish may be, for example, applied to a base material, or a base material may be impregnated with the varnish, and the solvent or the like may be removed by drying or the like, so that the varnish may be made into an uncured or semi-cured molded product. Generally, the molded product is in a sheet, film, or tape form. The resulting uncured or semi-cured molded product is cured under predetermined conditions such as heating or application of pressure.

Curing Process

The composition may be cured by a known method by reference to curing conditions (temperature, time and pressure) of the curing agent contained. In the case where the curing agent used is a peroxide, the curing conditions may be determined by reference to the half-life temperature and the like disclosed for each peroxide.

Cured Product of Composition

The dielectric constant and the dielectric tangent of the cured product obtained from the composition of the present invention are measured by a known resonator method. In the present specification, the resonator method is performed at a measurement frequency of 10 GHz or at a measurement frequency range of 25 GHz to 40 GHz, or at both thereof. The dielectric constant of the cured product may be preferably 3.5 or less and 2.0 or more, particularly preferably 3.0 or less and 2.0 or more. The dielectric tangent of the cured product is $1.2 \times 10^{-3}$ or less, and may be preferably $0.3 \times 10^{-3}$ or more and $1.2 \times 10^{-3}$ or less. The volume resistivity of the cured product is preferably $1 \times 10^{15}$ Ω·cm or more. These values are preferred values, for example, as an electrically insulating material for high frequencies of 3 GHz or more. Since the copolymer used in the composition of the present invention is relatively soft and has high tensile elongation, the cured product obtained from the composition using the copolymer has relatively high impact resistance and followability to the thermal expansion of a base material while exhibiting sufficient mechanical properties. That is, the cured product of the present invention has a tensile elastic modulus of preferably less than 30 GPa and 0.5 GPa or more, as measured at room temperature (23° C.). Further, the tensile strength at break is preferably less than 200 MPa and 3 MPa or more, and the tensile elongation at break is preferably 0.1% or more and less than 300%, more preferably 1% or more and less than 50%. Those skilled in the art may prepare a cured product by determining the formulation of the composition having the physical property parameters by reference to the information described in the specification and publicly known materials. The cured product obtained from the composition of the present invention has sufficient heat resistance and mechanical properties at high temperature for practical use even under condition with the monomer and the aromatic polyene as monomer component in the composition suppressed to a certain ratio or less. It is important to suppress the monomer and the aromatic polyene as monomer component to a certain ratio or less also for maintaining the moldability as a thermoplastic resin even in the uncured state as described above.

The cured product may have a storage elastic modulus at 250° C. of 10 MPa or more and 10 GPa or less, preferably in the range of 30 MPa or more and 1 GPa or less. With such a storage elastic modulus, the cured product may have a hardness suitable for use as a base material/substrate.

General Use of Compositions

The composition of the present invention may be used as a base material/substrate such as a single-layer or multi-layer printed circuit board, a flexible printed circuit board, a so-called single-layer or multi-layer CCL (copper clad laminate) or a single-layer or multi-layer FCCL (flexible copper clad laminate) base material. Further, the composition of the present invention may be used as various insulating materials for wiring, preferably wiring of high frequency signals, such as coverlays, solder resists, build-up materials, interlayer insulators, bonding sheets, interlayer adhesives, and bumps for flip chip bonders.

Use of Compositions as Uncured Sheet or Partially Cured Sheet

An uncured sheet or partially cured sheet of the composition of the present invention may be suitably used as an electrically insulating material for high frequencies. For example, the sheet may be suitably used as a build-up film, a bonding sheet, a coverlay sheet, a bump sheet for flip chip bonders, or an insulating layer or adhesive layer for substrates. The composition of the present invention is used as a substitute for the conventionally used epoxy resin or silicone resin sheets. The composition of the present invention may be cured to form a cured insulating layer or cured matrix phase having a low dielectric constant and low dielectric loss. The thickness of the sheet is generally 1 to 300 μm. The sheet may contain a woven fabric and non-woven fabric of glass cloth or ceramic fiber. The sheet may be used for impregnation, or may be multilayered with the fabric. Further, as an antenna cable for mobile phones or the like, a flexible and bendable wiring partially or wholly insulated with the sheet may be used instead of the conventional coaxial cable. For example, using an LCP (liquid crystal polymer), a PPE sheet, a fluororesin, or a polyimide resin as a base material, wiring is coated with the sheet or B stage sheet (coverlay sheet) of the present invention. The sheet is then cured and adhered to the base material for use as an insulating material.

The multilayer wiring board having an insulating layer of the cured product obtained by using the composition of the present invention may be a wiring board having a small dielectric loss and excellent high frequency properties. In this case, the merits include heat resistance that can withstand soldering, and a certain degree of softness, elongation, and impact resistance that may withstand stress due to heat cycle or thermal expansion difference, in addition to low dielectric loss. For example, a core material such as a cloth made of glass or quartz, a non-woven fabric, a film material, a ceramic substrate, a glass substrate, a general-purpose resin plate of epoxy, and a general-purpose laminated plate, and a conductor foil with an insulating layer made of the cured product are laminated and pressed to prepare a wiring board. Alternatively, a slurry or solution containing the present composition may be applied to a core material, dried and cured to form an insulating layer. The thickness of the insulating layer is generally 1 to 300 Such a multi-layer wiring board may be multilayered or integrated for use.

The cured product obtained by curing the composition of the present invention in a varnish form, in particular, may be suitably used as an electrically insulating material as described above. In particular, the cured product may be used as an electrically insulating material, particularly as an electrically insulating material for high frequencies, including as a potting material, a surface coating agent, a coverlay, a solder resist, a build-up material, an underfill material, a filling insulator, an interlayer insulator, and an interlayer adhesive, or as a cured product for a printed circuit board, a flexible printed circuit board, CCL (copper clad laminate) base material, or a FCCL (flexible copper clad laminate) base material, or as a cured product for a build-up film, a bonding sheet, a coverlay sheet, or a bump sheet for flip tip bonders.

From another point of view, the present invention may provide an electrically insulating material containing an olefin-aromatic vinyl compound-aromatic polyene copolymer, and having a storage elastic modulus at 250° C. of 10 MPa or more and 10 GPa or less, and a dielectric constant of 3.5 or less and 2.0 or more and a dielectric tangent of $1.2 \times 10^{-3}$ or less at 23° C. and 10 GHz or in the range of 25 GHz to 40 GHz.

The uncured or semi-cured thermoplastic composition of the present invention may be adhered to a metal foil, particularly to a copper foil for wiring by heating under pressure without application of an adhesive or without adhesive treatment to obtain a laminate. Here, the metal foil includes metal wiring. In particular, a peel strength of 1 N/mm or more in the measurement according to the Japanese Industrial Standards (JIS) C6481: 1996 may be imparted in the case where the olefin-aromatic vinyl compound-aromatic polyene copolymer has an aromatic vinyl compound content of 10 mass % or more, and/or the olefin is ethylene alone or the mass ratio of the olefin monomer component other than ethylene to the ethylene monomer component contained in the olefin is 1/7 or less. Furthermore, it is more preferable to impart a peel strength of 1.3 N/mm or more. More preferably, the peel strength may be further improved in the case where the copolymer includes ethylene alone as olefin, or the content of olefin monomer components other than ethylene is 1/10 or less relative to the ethylene monomer component contained in the olefin, most preferably the content of α-olefin monomer units other than ethylene contained in the copolymer is 4 mass % or less, or the olefin is ethylene alone. In general, it is known that the dielectric properties of a laminate such as copper-clad laminate are degraded by adhesive treatment. It is therefore preferable that a peel strength of 1 N/mm or more be imparted in the measurement in accordance with Japanese Industrial Standards (JIS) C6481: 1996 without such a treatment. As described above, the uncured or semi-cured thermoplastic composition of the present invention may be adhered to the metal foil such as copper foil for wiring by a curing treatment such as heating under pressure, without application of an adhesive or an adhesive treatment. However, in the present invention, with respect to imparting adhesiveness to metal foil and other members, other adhesiveness-imparting measures (application of an adhesive, adhesive treatment, etc.) including addition of the "surface modifier" may be implemented without any preclusion. It is of course possible to obtain a cured product by curing the laminate.

The composition of the present invention such as the curable composition has properties of a thermoplastic resin. Further, having excellent low dielectric properties, a high storage elastic modulus at high temperature, and a small coefficient of thermal expansion (CTE), the cured product obtained by curing the curable composition is particularly suitable for use as various electronic base materials.

EXAMPLES

Hereinafter, the present invention will be described with reference to Examples, though the present invention is not limited to the following Examples.

The copolymers obtained in synthetic examples and comparative synthetic examples were analyzed by the following means.

The content of vinyl group units derived from ethylene, hexene, styrene, and divinylbenzene in a copolymer was determined by $^1$H-NMR based on the peak area intensity assigned to each. The sample was dissolved in heavy 1,1,2,2-tetrachloroethane, and the measurement was performed at 80 to 130° C.

As molecular weight, the number average molecular weight (Mn) in terms of standard polystyrene was determined by GPC (gel permeation chromatography). The measurement was performed under the following conditions. In the case where the number average molecular weight is 1000 or more:

Column: Two TSKgel Multipore HXL-M having a diameter of 7.8 mm and a length of 300 mm (manufactured by Tosoh Corporation) were connected in series for use.
Column temperature: 40° C.
Solvent: THF
Liquid flow rate: 1.0 ml/min.
Detector: RI detector Measurement of Storage Elastic Modulus Using a dynamic viscoelasticity measuring apparatus (RSA-G2 manufactured by TA Instruments, or former Rheometric Scientific), measurement was performed at a frequency of 1 Hz in a temperature range of −60° C. to +300° C. A measurement sample (3 mm×40 mm) cut out from a film having a thickness of about 0.1 to 0.3 mm with uniformity required for the measurement was subjected to measurement for determining the storage elastic modulus. The main measurement parameters related to the measurement are as follows.

Measurement frequency: 1 Hz
Rate of temperature rise: 3° C./min
Measurement length of sample: 10 mm
Distortion: 0.1%

Coefficient of Water Absorption
Measurement was performed in accordance with ASTM D570-98.

Dielectric Constant and Dielectric Loss (Dielectric Tangent)
A sample with sizes of 1 mm×1.5 mm×80 mm cut out from a sheet was used for the measurement of the dielectric constant and dielectric tangent by a cavity resonator perturbation method (8722ES type network analyzer manufactured by Agilent Technologies Japan, Ltd., and cavity resonator manufactured by KANTO Electronic Application and Development Inc.), at 23° C. and 10 GHz. Further, using a balanced disk resonator (manufactured by Keysight Technologies, Inc.), the dielectric properties were evaluated in the same manner. In the dielectric property evaluation method with the balanced disc resonator, two identical samples (diameter: 3 cm, thickness: 0.2 to 0.6 mm) were prepared to sandwich a copper foil between them. The whole was set in the resonator, and the resonance frequency (f0) of the peak appearing at 25 to 40 GHz and the no-load Q value (Qu) were measured. The dielectric constant was calculated from f0, and the dielectric tangent (tan δc) was calculated from Qu using the attached analysis software (Balanced type circular disk resonator (method) calculator). The measured temperature was 23° C. and the humidity was 50% RH.

CTE (Coefficient of Linear Thermal Expansion)
With reference to a JPCA standard "Electronic Circuit Board Standard, Third Edition", Section 16, Material Standard for Printed Wiring Circuit Board, CTE as an average between 25° C. and 150° C. was determined from measurement with a thermomechanical analyzer (TMA: Thermomechanical Analyzer, manufactured by BRUKER AXS, currently, NETZSCH Japan K.K.) under conditions including width: 3 to 5 mm, thickness: 0.5 to 0.6 mm, chuck spacing: 15 to 20 mm, tensile load: 10 g, and temperature rise rate: 10° C./min.

Average Particle Size (d50)
The size was determined from the volume particle size distribution curve obtained from a laser diffraction type particle size measuring instrument (Beckman Coulter, Inc. "Model LS-230" type).

Specific Surface Area
A measurement cell was filled with 1 g of a sample to measure the specific surface area by a fully automatic specific surface area measuring device Macsorb HM model-1201 manufactured by Mountech Co. Ltd. (single point BET). The degassing conditions before measurement were at 200° C. for 10 minutes. The adsorbed gas was nitrogen.

Olefin-Aromatic Vinyl Compound-Aromatic Polyene Copolymer

With reference to the production methods in International Publication No. WO 00/37517, Japanese Patent Laid-Open No. 2009-161743, and Japanese Patent Laid-Open No. 2010-280771, the monomer amount, ratio, polymerization pressure and polymerization temperature were appropriately changed to obtain copolymers P-1 to P-2. Further, with reference to the production methods in Japanese Patent Laid Open No. 9-40709, and Japanese Patent Laid-Open No. 9-309925, a P-3 copolymer was obtained by polymerization using dimethylmethylene biscyclopentadienyl zirconium dichloride as a catalyst, methylalumoxane (manufactured by Tosoh Finechem Corporation, MMAO-3A toluene solution) as a co-catalyst, and styrene, divinylbenzene, and ethylene as raw materials. The total of the olefin monomer unit, the aromatic vinyl compound monomer unit, and the aromatic polyene monomer unit was set to 100 mass %. In Table 1, the composition and the number average molecular weight of the copolymer are shown.

The main raw materials are as follows.

As the divinylbenzene, divinylbenzene (meta and para mixture, divinylbenzene purity: 81%) manufactured by NIPPON STEEL Chemical & Material Co., Ltd. was used. As curing agent, Perbutyl O (t-butylperoxy-2-ethylhexanoate) manufactured by NOF CORPORATION or Percumyl D (dicumyl peroxide) manufactured by NOF CORPORATION was used.

As the silica, SFP-130MC (d50=0.6 μm, specific surface area: 6.2 m²/g, density: 2.2 g/cm³) manufactured by Denka Company Limited was used in Comparative Examples, and SFP-130MC with dielectric tangent reduction treatment was used in Examples. The SFP-130MC with dielectric tangent reduction treatment (d50=0.6 μm, specific surface area: 6.2 m²/g, density: 2.2 g/cm³) is a surface-treated spherical silica powder manufactured by the method described in International Publication No. WO 2020/195205 and pending International Application PCT/JP2021/016377 by the present applicant. Specifically, a raw material spherical silica powder (SFP-130MC manufactured by Denka Company Limited) was heat-treated at a temperature of 500 to 1000° C., for a predetermined time period to satisfy a product of heating temperature [° C.] and heating time [h] of 1800 to 17600 [° C.·h] for use. The treatment was performed while flowing the raw material silica powder in an inert atmosphere. The silica satisfied both of the following conditions (a) and (b):

(a) the number of water molecules desorbed at 500° C. to 1000° C. is 0.01 mmol/g or less when the temperature is raised from 25° C. to 1000° C. under a condition of 30° C./min;

(b) the specific surface area is 1 to 30 m²/g.

Further, when the peak intensity in a range of wave number of 3735 cm⁻¹ to 3755 cm⁻¹ of silica measured by diffuse reflection FT-IR method is expressed as A, and the peak intensity in a range of wave number of 3660 cm⁻¹ to 3680 cm⁻¹ is expressed as B, B/A was 3.0 or less.

TABLE 1

| Copolymer | Ethylene content mass % | 1-Hexene content mass % | Styrene content mass % | Divinylbenzene vinyl group (Piece/Number average molecular weight) | Number average molecular weight Mn |
|---|---|---|---|---|---|
| P-1 | 48 | 0 | 51 | 4.1 | 55000 |
| P-2 | 46 | 4.6 | 48 | 3.5 | 37000 |
| P-3 | 50 | 0 | 42 | 3.8 | 6400 |

TABLE 2

|  | Example 1 | Example 2 | Example 3 | Example 4 | Example 5 | Comparative Example 1 |
|---|---|---|---|---|---|---|
| P-1 (Part by mass) | 100 | — | 100 | 100 | — | 100 |
| P-2 (Part by mass) | — | 100 | — | — | — | — |
| P-3 (Part by mass) | — | — | — | — | 100 | — |
| Styrene (Part by mass) | 184 | 92 | — | — | — | 184 |
| Divinylbenzene (Part by mass) | 16 | 8 | — | — | — | 16 |
| Bifunctional polyphenylene ether oligomer (OPE-2St) | — | — | 70 | 70 | — | — |
| Solvent (toluene) | — | — | 200 | 200 | 100 | — |
| Curing agent | 1 part by mass * | 1 part by mass * | 1 part by mass * | 1 part by mass * | 1 part by mass * | 1 part by mass * |
| Resin component | 50 vol % | 50 vol % | 50 vol % | 70 vol % | 70 vol % | 50 vol % |
| Silica filler (SPF-130MC) | — | — | — | — | — | 50 vol % |
| Silica Filler (SPF-130MC with dielectric tangent reduction treatment) | 50 vol % | 50 vol % | 50 vol % | 30 vol % | 30 vol % | — |
| Storage elastic modulus (250° C.)/MPa | 160 | 190 | 210 | 110 | 20 | 154 |
| CTE(ppm/° C.) | 50 | 50 | 35 | 120 | 110 | 50 |
| Dielectric constant (10 GHz) | 2.9 | 2.9 | 2.9 | 2.8 | 2.6 | 2.8 |
| Dielectric tangent (10 GHz) | 0.0011 | 0.0010 | 0.0011 | 0.0011 | 0.0009 | 0.0015 |
| Dielectric constant (25~40 GHz) | 2.98 | 2.94 | 2.83 | 2.74 | 2.64 | 2.93 |
| Dielectric tangent (25~40 GHz) | 0.0009 | 0.0009 | 0.0011 | 0.0011 | 0.0009 | 0.0014 |
| Coefficient of water absorption/mass % | <0.05 | <0.05 | <0.05 | <0.05 | <0.05 | <0.05 |

|  | Comparative Example 2 | Comparative Example 3 | Comparative Example 4 | Comparative Example 5 |
|---|---|---|---|---|
| P-1 (Part by mass) | — | 100 | — | 100 |
| P-2 (Part by mass) | 100 | — | 100 | — |
| P-3 (Part by mass) | — | — | — | — |
| Styrene (Part by mass) | 92 | 184 | 92 | — |
| Divinylbenzene (Part by mass) | 8 | 16 | 8 | — |
| Bifunctional polyphenylene ether oligomer (OPE-2St) | — | — | — | 70 |
| Solvent (toluene) | — | — | — | 200 |
| Curing agent | 1 part by mass * | 1 part by mass * | 1 part by mass * | 1 part by mass * |
| Resin component | 50 vol % | 100 vol % | 100 vol % | 100 vol % |
| Silica filler (SPF-130MC) | 50 vol % | — | — | — |
| Silica Filler (SPF-130MC with dielectric tangent reduction treatment) | — | — | — | — |
| Storage elastic modulus (250° C.)/MPa | 186 | 2.2 | 1.8 | 1.5 |

TABLE 2-continued

| | | | | |
|---|---|---|---|---|
| CTE(ppm/° C.) | 50 | 140 | 230 | 190 |
| Dielectric constant (10 GHz) | 2.9 | 2.4 | 2.4 | 2.4 |
| Dielectric tangent (10 GHz) | 0.0015 | 0.0013 | 0.0013 | 0.0015 |
| Dielectric constant (25~40 GHz) | 2.93 | 2.47 | 2.44 | 2.41 |
| Dielectric tangent (25~40 GHz) | 0.0015 | 0.0014 | 0.0013 | 0.0016 |
| Coefficient of water absorption/mass % | <0.05 | <0.05 | <0.05 | <0.05 |

\* 1 part by mass was added relative to 100 parts by mass of raw materials other than curing agent and solvent in total.

Example 1

In a container with a heater, a cooling jacket, and a stirring blade, P-1 (ethylene-styrene-divinylbenzene copolymer), styrene, and divinylbenzene obtained in Synthetic Example were stirred at about 40° C. to dissolve the copolymer. In Table 2, the formulation (part by mass) of the resin component (total of the ethylene-styrene-divinylbenzene copolymer, styrene and divinylbenzene) is shown. The total of the olefin monomer unit, the aromatic vinyl compound monomer unit and the aromatic polyene monomer unit was set to 100 mass %. Further, 1 part by mass of the curing agent Perbutyl O (manufactured by NOF CORPORATION) was added to 100 parts by mass of the resin component to be dissolved. The mixture was stirred and mixed to obtain a composition in a varnish form. A silica filler (SFP-130MC with dielectric tangent reduction treatment) was added thereto and stirred to obtain a varnish in slurry form. Relative to 50 vol % of the resin component, 50 vol % of silica filler was used.

The resulting composition was further stirred with Awatori Rentaro (manufactured by THINKY CORPORATION), and then poured into a mold of silicone rubber (thickness of the frame: 0.5 mm or 1.0 mm) disposed on a pre-heated glass plate coated with cellophane, sandwiched with a glass plate from the above, closely contacted thereto with a clip, and heat-treated at 80° C. for 10 hours, and then at 120° C. for 30 minutes under nitrogen atmosphere. After completion, the glass plate, mold, etc. were removed to obtain a cured product in sheet form.

Example 2

Using P-2 (ethylene-styrene-divinylbenzene copolymer) obtained in Synthesis Example and a silica filler (SFP-130MC with dielectric tangent reduction treatment), a cured product in a sheet form was obtained from the formulation in Table 2 in the same manner as in Example 1.

Examples 3 and 4

Using P-1 (ethylene-styrene-divinylbenzene copolymer) obtained in Synthesis Example and a bifunctional polyphenylene ether oligomer (OPE-2St) manufactured by Mitsubishi Gas Chemical Company, Inc., a varnish was prepared from the formulation in Table 2. As the curing agent, Percumyl D was used, and as the solvent, toluene was used. A silica filler (SFP-130MC with dielectric tangent reduction treatment) was added thereto according to the formulation in Table 2, and stirred to prepare a varnish in a slurry form. In parallel with addition of the silica filler, 1 mass % of a silane coupling agent (KBM-503) relative to the filler was added. The resulting slurry was stirred with Awatori Rentaro (manufactured by THINKY CORPORATION), then applied to a Teflon (registered trademark) sheet with an applicator, air-dried overnight (about 10 hours), and then vacuum dried at 60° C. for 1 hour so as to prepare an uncured sheet. On a PET film placed on a mirror surface metal sheet, a frame (spacer, thickness of frame: 0.5 mm or 1.0 mm) was disposed, and the uncured sheet was placed in the frame. On the uncured sheet, a PET film and a mirror surface metal sheet were placed, and heat curing was performed with a pressing machine (about 1 MPa, at 120° C. for 30 minutes, at 150° C. for 1 hour, and then at 180° C. for 2 hours) to obtain a cured sheet.

Example 5

Using P-3 (ethylene-styrene-divinylbenzene copolymer) obtained in Synthesis Example, a varnish was prepared from the formulation in Table 2. A cured sheet was obtained in the same manner as in Examples 3 and 4.

Comparative Examples 1 to 2

Cured products in a sheet form in Comparative Examples 1 to 2 were obtained in the same manner as in Examples 1 to 2, respectively, except that SFP-130MC was used as a silica filler, instead of the SFP-130MC with dielectric tangent reduction treatment.

Comparative Examples 3 to 4

Cured products in a sheet form in Comparative Examples 3 to 4 were obtained in the same manner as in Examples 1 to 2, respectively, except that no silica filler was used.

Comparative Example 5

A cured products in a sheet form in Comparative Example 5 was obtained from the formulation in Table 2 in the same manner as in Examples 3 and 4, except that no silica filler was used.

The elastic modulus of cured product of the composition sheet obtained in each Example was measurable without melt fracture even at 300° C. in viscoelastic spectrum measurement, and the storage elastic modulus at 250° C. (523 K) was 10 MPa or more. Both the dielectric constant and the dielectric tangent measured at the two measurement frequencies satisfied the scope of the present invention, and a particularly low dielectric tangent value was obtained. These dielectric tangent values were lower than those in the case of using conventional silica fillers in Comparative Examples 1 and 2. Further, in any of Examples, CTE was 120 ppm/° C. or lower, which was lower than those of Comparative Examples 3 to 5 in which no filler was added. The coefficient of water absorption of the cured film obtained in each Example was less than 0.1 mass %.

In contrast, the cured sheet obtained in any of Comparative Examples was unpreferred due to too high dielectric tangent in view of the object of the present invention. Further, in Comparative Examples 3 to 5, problems were that the storage elastic modulus at 250° C. was too low for CCL, and CTE was too large for CCL.

The results show that the cured products obtained by curing the filler composition of the present invention exhibit excellent low dielectric properties and low CTE properties, and the strength (elastic modulus) at room temperature and in high temperature range is practically sufficient for CCL. Further, the peeling strength from a copper foil is also practically sufficient. The cured product according to the present invention may be suitably used as an electrically insulating material particularly for high frequency. The cured product may be suitably used as a thin-film electrically insulating material and an electrically insulating material for high frequency. The cured product of the present invention is useful as a printed circuit board, a flexible printed circuit board, a single-layer or multi-layer CCL (copper clad laminate) substrate, and a single-layer or multi-layer FCCL (flexible copper clad laminate) base material. Further, the cured product of the present invention may be suitably used as an interlayer adhesive layer or interlayer insulating layer thereof.

The invention claimed is:

1. A composition, comprising:
   a resin component including an olefin-aromatic vinyl compound-aromatic polyene copolymer; and
   a surface-treated silica, and
   wherein the olefin-aromatic vinyl compound-aromatic polyene copolymer satisfies all the following conditions (1) to (4):
   (1) a number average molecular weight of the copolymer is 500 or more and 100000 or less;
   (2) the aromatic vinyl compound monomer is an aromatic vinyl compound having 8 or more and 20 or less carbon atoms, and a content of a unit of the aromatic vinyl compound monomer is 0 mass % or more and 70 mass % or less;
   (3) the aromatic polyene is one or more selected from polyenes having 5 or more and 20 or less carbon atoms and having a plurality of vinyl groups and/or vinylene groups in the molecule, and a content of the vinyl groups and/or the vinylene groups derived from the unit of the aromatic polyene is 1.5 pieces or more and less than 20 pieces per number average molecular weight; and
   (4) the olefin is one or more selected from olefins having 2 or more and 20 or less carbon atoms, and a total of units of the olefin monomer, the aromatic vinyl compound monomer, and the aromatic polyene monomer is 100 mass %,
   wherein a volume ratio between the resin component and the silica is in a range of 85 to 15:15 to 85,
   wherein a cured product of the composition has a value of dielectric tangent of $1.2 \times 10^{-3}$ or less, wherein the value of dielectric tangent is obtained by resonator method at a measurement frequency of 10 GHz and/or a measurement frequency range of 25 GHz to 40 GHz,
   wherein the cured product of the composition has a storage elastic modulus at 250° C. in a range of 10 MPa or more and 10 GPa or less, and
   wherein the silica satisfies at least one of the following conditions (a) to (b):
   (a) the number of water molecules desorbed at 500° C. to 1000° C. is 0.01 mmol/g or less when a temperature is raised from 25° C. to 1000° C. under a condition of 30° C./min; and
   (b) a specific surface area is 1 to 30 m²/g.

2. The composition according to claim 1, wherein when a peak intensity in a range of wave number of 3735 cm⁻¹ to 3755 cm⁻¹ of silica measured by diffuse reflection FT-IR method is expressed as A, and the peak intensity in a range of wave number of 3660 cm⁻¹ to 3680 cm⁻¹ is expressed as B, a value of B/A is 3.0 or less.

3. The composition according to claim 1, wherein the silica is subjected to surface treatment including heat-treating a raw material silica at a temperature of 500 to 1100° C. for a predetermined time period to satisfy a product of heating temperature, in degrees° C., and heating time, in hours h, of 1000 to 26400° C.·h, where° C.·h is° C. multiplied by h.

4. The composition according to claim 1, further comprising one or more additional monomer(s) selected from the group consisting of an aromatic vinyl compound monomer, an aromatic polyene monomer, and a polar monomer.

5. The composition according to claim 4, wherein the additional monomer(s) in an amount of 300 parts by mass or less are contained relative to 100 parts by mass of the copolymer.

6. The composition according to claim 1, further comprising a curing agent.

7. The composition according to claim 1, wherein the silica is a spherical silica powder.

8. The composition according to claim 1, wherein the composition is curable.

9. A molded product of the composition according to claim 1.

10. The molded product according to claim 9, being a sheet.

11. A cured product of the molded product according to claim 9.

12. The molded product according to claim 9, being an electrically insulating material.

13. A laminate, comprising:
    a layer containing the composition according to claim 1; and
    a metal foil.

14. A cured product of the laminate according to claim 13.

15. A single-layer CCL, a multi-layer CCL, a single-layer FCCL or a multi-layer FCCL base material, comprising the cured product according to claim 12.

16. A cured product of the molded product according to claim 10.

17. The molded product according to claim 10, being an electrically insulating material.

18. A single-layer CCL, a multi-layer CCL, a single-layer FCCL or a multi-layer FCCL base material, comprising the cured product according to claim 14.

* * * * *

UNITED STATES PATENT AND TRADEMARK OFFICE
CERTIFICATE OF CORRECTION

PATENT NO. : 12,359,049 B2
APPLICATION NO. : 18/026028
DATED : July 15, 2025
INVENTOR(S) : Toru Arai et al.

Page 1 of 1

It is certified that error appears in the above-identified patent and that said Letters Patent is hereby corrected as shown below:

In the Claims

Column 28, Claim 15, Line 51, "according to claim 12" should be "according to claim 11".

Signed and Sealed this
Twenty-fifth Day of November, 2025

John A. Squires
*Director of the United States Patent and Trademark Office*